United States Patent [19]

Slocum et al.

[11] Patent Number: 5,848,869
[45] Date of Patent: Dec. 15, 1998

[54] CONTAINER RESTRAINING MECHANISM AND METHOD

[75] Inventors: Alexander H. Slocum, Bow; John William Meskoe, Concord, both of N.H.

[73] Assignee: AESOP, Inc., Concord, N.H.

[21] Appl. No.: 759,870

[22] Filed: Dec. 3, 1996

[51] Int. Cl.⁶ .................................................. B60P 1/65
[52] U.S. Cl. ........................ 414/500; 414/480; 414/494
[58] Field of Search ........................... 220/1.5; 414/480, 414/491, 492, 493, 494, 499, 498, 500

[56] References Cited

U.S. PATENT DOCUMENTS

| 3,897,882 | 8/1975 | Budoff | 414/500 |
| 5,085,448 | 2/1992 | Shubin | 414/500 X |
| 5,284,266 | 2/1994 | Januel et al. | 414/498 X |

FOREIGN PATENT DOCUMENTS

| 71143 | 1/1976 | Australia | 414/500 |
| 481367 | 4/1992 | European Pat. Off. | 414/480 |
| 1080210 | 12/1954 | France | 414/500 |
| 2686843 | 8/1993 | France | 414/500 |
| 1430217 | 3/1969 | Germany | 414/494 |
| 8607019 | 12/1986 | WIPO | 414/494 |

Primary Examiner—Frank E. Werner
Attorney, Agent, or Firm—Rines & Rines

[57] ABSTRACT

A system and technique for holding down and restraining a roll-off container in place as it is winched into its final position on the bed of a truck or other transport device, wherein, as the roll-off container is winched into position on the truck, a protuberance on the side of the bottom rail of the roll-off container slides into a mating interlocking cradle attached to the truck. The sliding mate can be of a cantilevered spear into a socket, or more generically, a sliding open-ended mate such as a dovetail. In the event of a crash or sudden stop, the roll-off container will thus be retained by the interlocking connection.

5 Claims, 4 Drawing Sheets

CONTAINER RESTRAINING MECHANISM AND METHOD

The present invention relates to containers carried on truck or other transport beds and the like, as for filing and disposing of materials—so-called roll-off containers; being more particularly concerned with improved systems for holding down and restraining a roll-off container in place as it is winched into its final position on the bed of a truck or other transport device, hereinafter sometimes generically described as a "truckbed" or the like.

BACKGROUND

The use of roll-off containers is increasing greatly due to closure of landfills and the emergence of recycling centers.

Currently, roll-off containers rely on their own weight to remain on a truck body which results also in serious problems in a crash, sudden stop, or the truck going too fast around a curve.

Roll-off containers, moreover, are often severely handled, and operators have stressful schedules, so speed is of the essence. Unfortunately, the former leads to easy damage of all but the most robust appendages, and the latter means that truckers often speed. As a result, the weight of the roll-off container is relied on to keep the roll-off container on the truck, and particularly if the roll-off container is empty, and the driver hits the brakes, the roll-off container can flip over the top of the truck, often severely injuring or killing the driver and other people in front of the truck.

While the art is replete with various types of machinery latches, in the field of truck-type systems, the unique functional requirements of roll-off container systems and the like appear not to have been satisfactorily addressed, if at all; and especially the need for an unobtrusive system that will not become damaged when the container is pushed around on the ground (often by a bulldozer of other piece of heavy equipment). In addition to not becoming damaged, the components must also not act as grapple-hooks and cause the container to get caught on surfaces that abound in rough environments. For example, hook-type structures can easily become caught on the sharp edge of a pothole, or a curb, or uneven pavement. Another major functional requirement, that the system be able to accommodate a very wide tolerance range on system components, has also not been adequately addressed In this invention, as the roll-off container is winched into position on the truck, a protuberance on the side of the bottom rail of the roll-off container slides into a mating cradle attached to the truck. The sliding mate can be of a cantilevered spear into a socket, or more generically, a sliding open-ended mate such as a dovetail. In the event of a crash or sudden stop, the roll-off container will be retained by the interlocking connection.

U.S. Pat. No. 4,273,382, for example, applies to dumptrucks and trailers which have a tiltable body hinged at the rear. The device described guides and aligns the front of the body as it descends onto the truck frame—probably useful when traveling or dumping across a sloping surface. The mechanism is essentially a spring-loaded tapered engagement latch as distinguished from the hereinafter described sliding engaging tapered component system of the present invention, specifically designed for the application to roll-off containers.

U.S. Pat. No. 4,992,014 addresses problems encountered with containers which must be lifted on or off the carrier, instead of being rolled on or off. The device employs locking cams that require the container to be lowered onto the system and then translated to engage the cams. The system will not, however, work with nor is it easily adapted to a roll-off container that is loaded by translational motion onto the truck. In addition, the system described requires ground surfaces that require unrealistic tolerances.

A dovetail engagement system is described in U.S. Pat. No. 4,787,789 that places a T-shaped flange on the container bottom and open slots on the truck, such that when the container is lowered onto the truck, the T-shaped flanges are guided into the slots. By then translating the container forward, the T-shaped flanges will become engaged with a mating female groove. This mechanism requires close tolerances and fundamentally different and incompatible engagement means than a roll-off container is capable of making.

A mechanism for a side-tilting container that once again is incompatible with a roll-off container is taught in U.S. Pat. No. 4,527,939; and U.S. Pat. No. 4,805,859 discloses essentially a double-dovetail system, commonly used on machine tool carriages, but here applied to tackle boxes. On a roll-off container, on the other hand, the male, or the female shape would quickly become bent or clogged with debris and thus such a structure does not represent a robust design for roll-off containers.

U.S. Pat. No. 4,129,395 is a patent for a rotary cam lock system, typically used on shipping containers when they are being hauled on a trailer, but again not applicable to roll-off containers, because operators do not want to be held liable for having manually to engage lock-down devices.

Another connecting method is disclosed in U.S. Pat. No. 4,456,414 for interchangeable truck bodies. The connection is by a hook and tab that requires a manually inserted wedge to maintain the connection. To engage the device, the container is lowered onto the truck, and then slid forward. A wedge is then driven in place that prevents the container from translating and then dislodging. In addition to requiring a vertical and then a translation motion, once again, the elements shown are protruding and would quickly become destroyed during normal use of a roll-off container.

OBJECTS OF THE INVENTION

An object of the present invention, accordingly, is to provide a new and improved system and method for holding roll-off containers onto the body of a truck that are not subject to the above and other limitations of prior devices and that provide holding action, even in the event of a severe crash.

Another object of the invention is to provide a simple passive structural addition to retrofit existing roll-off containers that will allow them to be retained on the truck body as they reach their final winched-in-place position without requiring any active (actuated) hardware.

An additional object is to provide a simple passive structural addition to retrofit existing roll-off containers that will not become damaged, or cause the container to become damaged, even if the container is dragged around a rough site.

Another object of the invention is to provide a simple passive mating structure on the truck tilting frame that will interlock with the structural element on the roll-off container frame, during the last foot or so of the forward motion of the roll-off container as it is winched in place on the truck tilting frame.

A still further objective is to provide novel structural additions to the roll-off container and truck tilting frame which will allow them to be used with other trucks or roll-off containers which do not have these additions, although without the hold-down feature.

Another object is to provide the structural additions to the roll-off container and truck tilting frame which can be used with any length roll-off container, and will not impede the loading/unloading of any length roll-off container.

Other and further objects will be explained hereinafter and are more fully delineated in the appended claims.

SUMMARY

In summary, the invention embraces a system designed to engage two slidably mating structures such that when a roll-off container is winched onto the tilting bed of a truck, the structures mate during the last few feet (or inches depending on the shape) of the roll-off container motion, thereby restraining the roll-off container to the truck in the event of a crash, sudden stop, or high speed turn.

More specifically, the invention provides a method of holding and restraining a longitudinally extending roll-off container on a longitudinally extending truckbed along which, during inclined elevation of the bed, the container has been upwardly winched into position for carrying on the truckbed when the bed is lowered to the horizontal transport position, and, thereafter, during such inclined elevation, the container is lowered downwardly along the bed to touch the ground, the method comprising, providing opposite corresponding regions of the longitudinal bottom edges of the container and the longitudinal side edges of the bed with respective protuberances and receptacles therefor that longitudinally slidingly interlock as the container is winched upwardly into position and longitudinally slidingly disengage as the container is winched downwardly off the inclined bed; and adjusting the locations of said regions so that the interlocking is effected during the last short distance of upward winching and the disengaging is affected during the initial short durance of downward winching.

Preferred and best mode embodiments will hereinafter be detailed.

DRAWINGS

The invention will now be described with reference to the accompanying drawing in which.

PREFERRED EMBODIMENT(S) OF THE INVENTION

Figure 1:
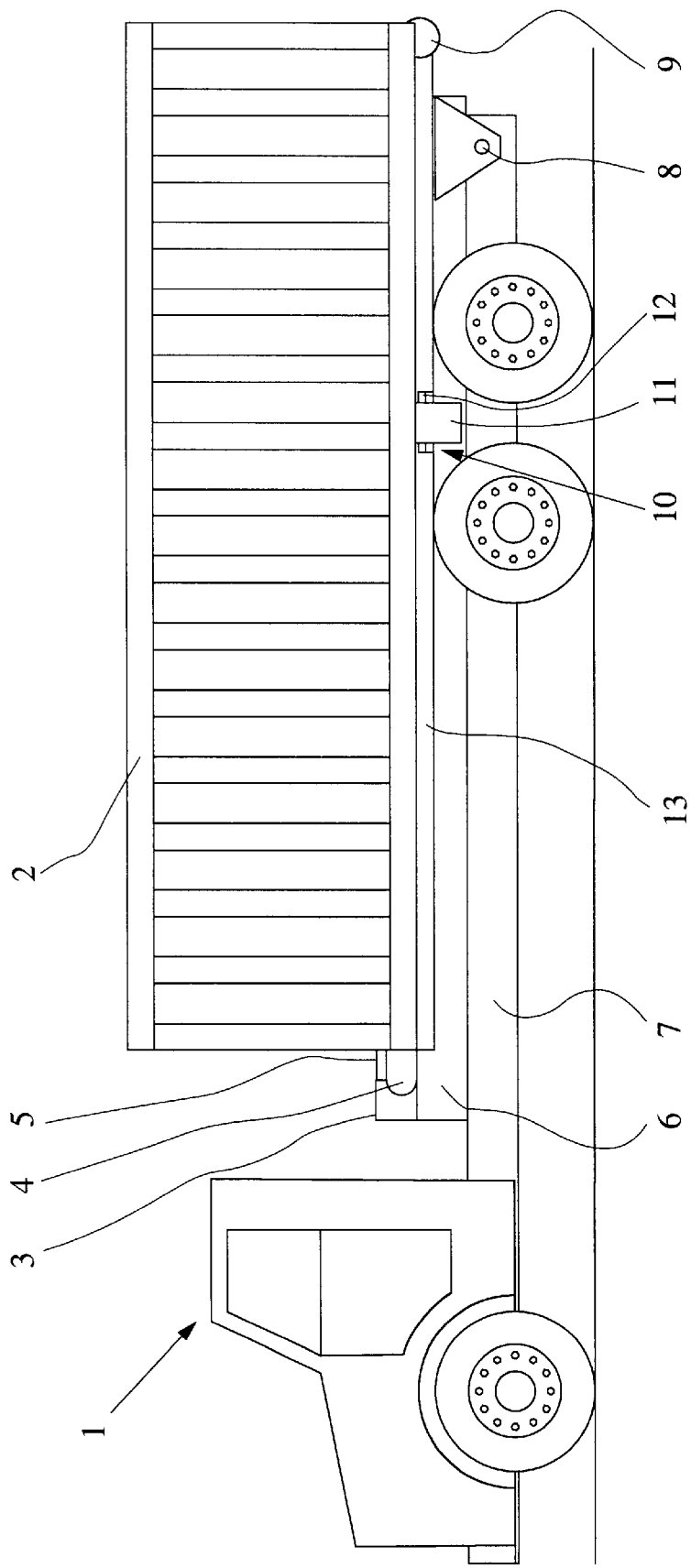
FIG. 1 is a side view of a roll-off container-carrying truck.
Figure 2:
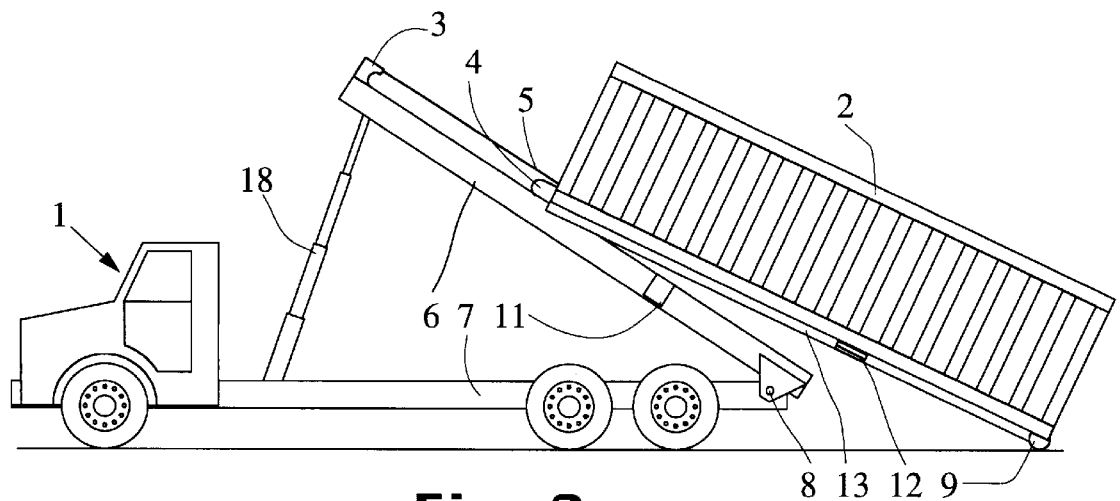
FIG. 2 is a side view showing the roll-off container being loaded/unloaded from a truck with a tilting bed.

A typical roll-off container truck 1 is shown in FIG. 1. In order to accommodate all lengths of roll-off containers 2, the locking device 10, as later made more evident, should be located as far towards the back of the truck as possible, but still a distance shorter than the shortest roll-off container the truck will haul. As shown in FIG. 1. the roll-off container 2 is conventionally held to the truck at a front anchor 3 by a mating rounded nose 4 attached to the roll-off container. The cable 5, which is used to winch the roll-off container into place, also acts to hold the nose 4 into the front anchor 3. The bottom of the roll-off container 2 has longitudinal structural rails (or edges) 13 that rest on either side of a conventional tilting structure 6 which may sometimes have wheels along its sides that assist in the roll-off container rolling off (not shown here). The tilting or inclining bed structure 6 is actuated by a piston 18, and it rotates about a point 8 as more particularly as shown in FIG. 2. As the roll-off container contacts the pavement, it rolls on wheels 9. The result is, as shown in FIG. 2, that the roll-off angle of the container with respect to ground is typically less than the angle of the tiling structure 6. Hence it is imperative that the restraining mechanism disengages shortly after the structure 6 starts tilting.

Fortunately, as soon as the structure 6 starts tilting to a reasonable angle, the roll-off container 2 will slide along the edge rails 6 at the same angle for many feet before it contacts the ground. Thus the restraining mechanism is sure to become disengaged. Similarly, when picking up the roll-off container, the roll-off container is fully in contact with the tilting structure for the last few feet of its motion.

This means that, in accordance with the techniques of the invention, the restraining device 10 must engage during the last foot or so of motion, and disengage similarly during the first foot or so of motion. To accomplish this, the system shown in FIG. 3 can be employed, in which the tilting structure longitudinal edge rail 6 is provided with a restraining bracket 11 welded to it, for example, as a retrofit. The roll-off container 2 longitudinal edge rail 13 correspondingly is provided with a receptacle bracket 12 welded to it, also, for example, as a retrofit. In this embodiment, the bracket is triangular (made from, for example, a piece of angle iron) and has a square section 14 welded to it, thereby allowing the rail 13 and bracket 12 to slide into the cavity formed by the portion 11' of the bracket 11. This creates a very loose tolerance system that is well-suited to being retrofitted to roll-off container and trucks. It should be noted that the square section 14 helps to act as a locking key, as otherwise the triangular section would act as a wedge when the roll-off container needs to be restrained. Other possible shapes, of course, may be used.

Figure 3:
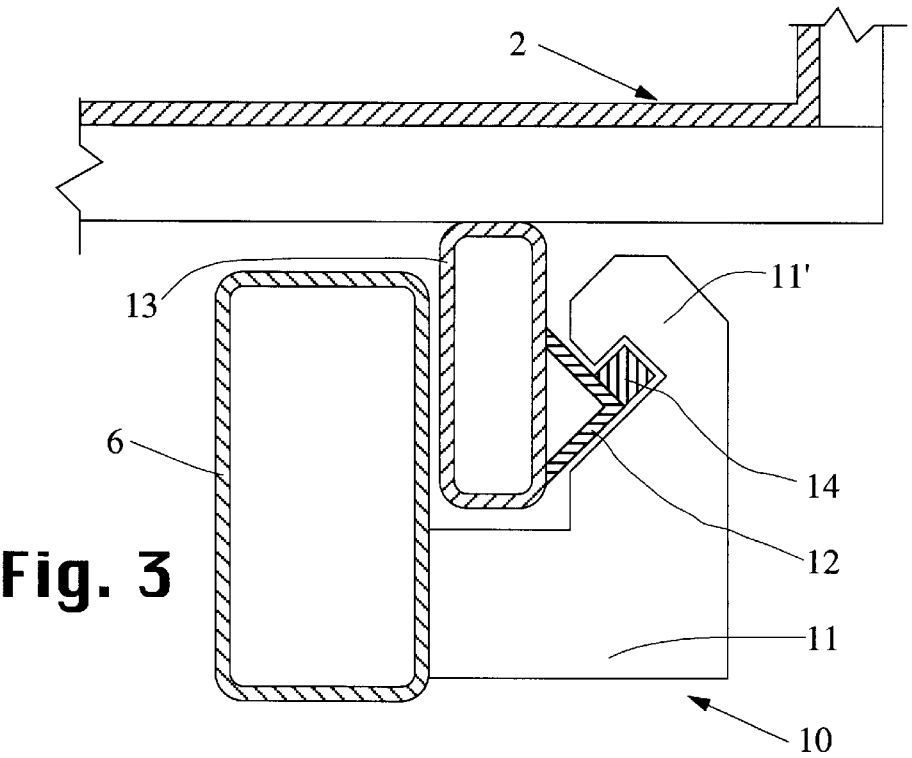
FIG. 3 is a section view through a portion of the truck and roll-off container showing a preferred sliding type of restraining device in accordance with the invention.

In this embodiment, a triangular section 12 was chosen because of its structural strength. This is a critical functional requirement, because it is attached to the bottom of the roll-off container, where it will undoubtedly get knocked around, so it must not be damagable. In FIG. 3, the triangular section is topologically a smooth protruding section that has no edges or hook-type sections that can become engaged against a rough pavement feature. This is important to prevent the container from becoming snagged on an object and causing damage.

Figure 4:
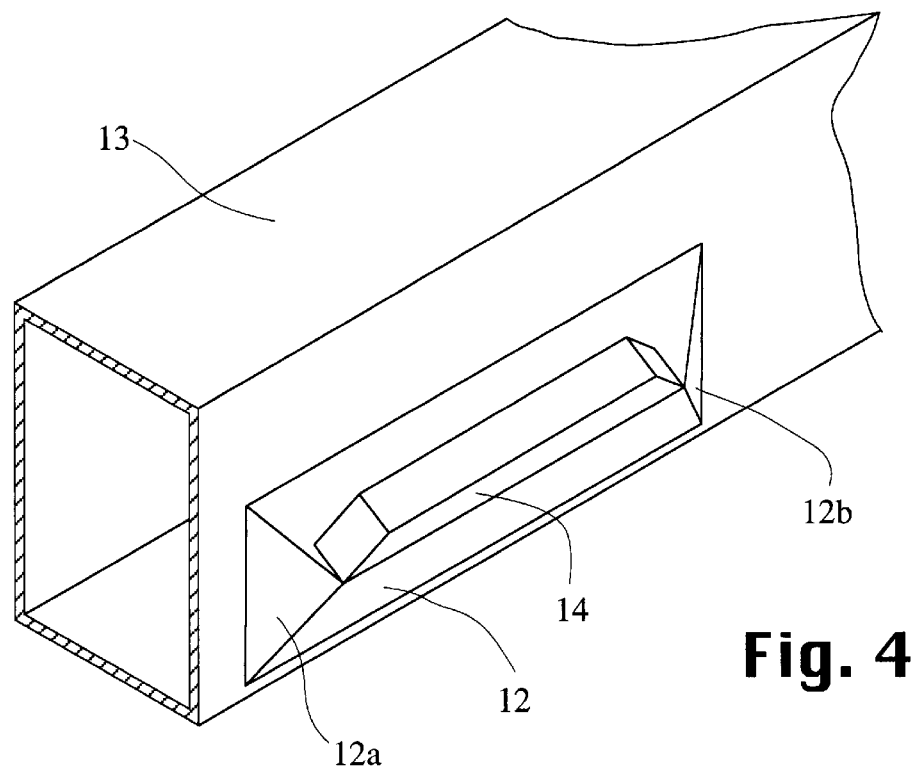
FIG. 4 is an isometric view of the restraining device portion of FIG. 3 that is attached to the roll-off container rail, showing how the ends can be tapered with a covering plate to increase strength and decrease the chance of damage.

FIG. 4 shows a portion of the roll-off container rail 13 with the triangular structure 12 with its welded-on square key section 14. Note, however, that in this isometric figure, the ends of the structure 12 are beveled so as to further prevent damage and ensure that the structure 12 can slidably mate with the capturing structure 11 shown in FIG. 3.

Figure 5:
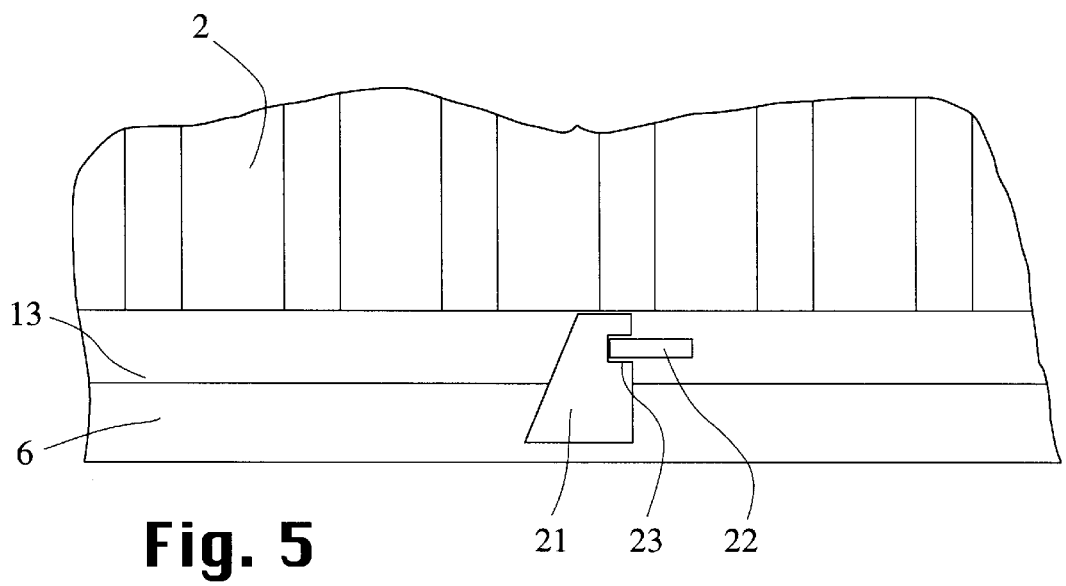
FIG. 5 is a side view of an alternate embodiment of the invention demonstrating another way to engage restraining devices during the last bit of motion of the roll-off container as it slides onto the truck.

FIG. 5 shows a further embodiment where the roll-off container slides forward and a protruding structure, such as just a rectangular block 22 welded to the roll-off container rail 13, engages a groove 23 in a block 21 welded to the tilting structure 6. This type of "plunging cantilever" can have many different forms (a spike in a socket, for example), but because of the cantilever nature, it is more prone to damage. This design has the advantage, however, of being less susceptible to varying width tolerances on the container longitudinal rails. To minimize a peeling effect in the engaging structural elements, furthermore, a toothed engagement can be used as shown in FIG. 6.

Figure 6:
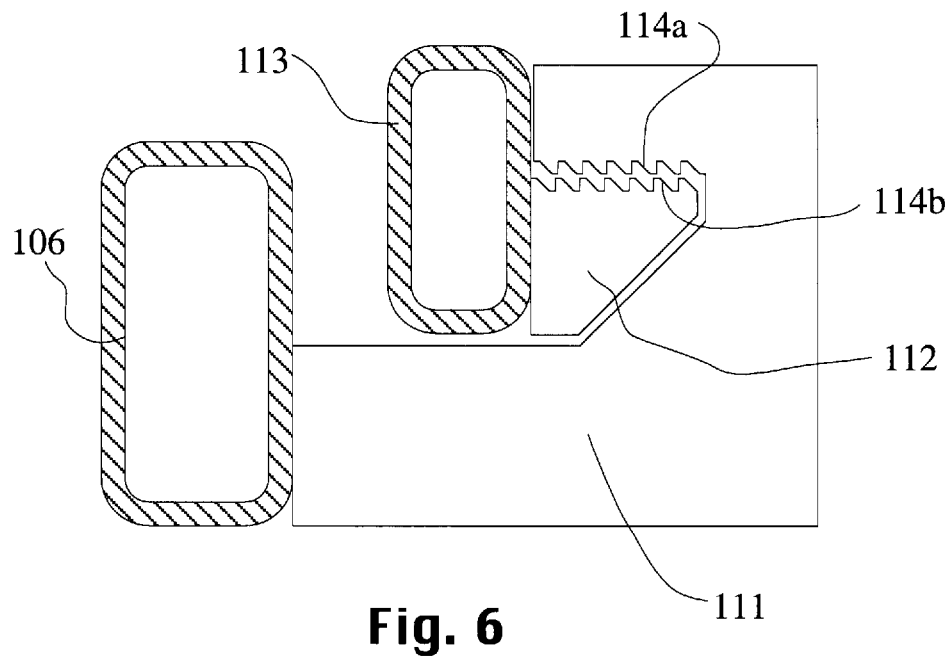
FIG. 6 is a cross-section view showing a toothed engagement design to allow for greater lateral tolerance on the width of roll-off container longitudinal rails, and the longitudinal rails of the truck.

In FIG. 6, the tilting structure rail(s) 106 has a longitudinal capture receptacle structure 111 welded to its lower half (one would be attached to each rail as mirror images). A block 112 is welded to the roll-off container rail 13. Between FIGS. 6 and 7, there is a large lateral motion between the rail 106 and the rail 113, accommodating the generally coarse tolerances that exist in the roll-off container industry. Because of these large tolerances, indeed, it is possible that, in the event the container does start moving in the vertical direction, the stresses in the member 111 will be reduced provided that lateral-induced bending deflections can be restrained. This is accomplished through the use of teeth 114*b* in block 112 and teeth 114*a* in structure 114*a*. These teeth are not critical to the functioning of the device, but they do provide an extra margin of safety.

To illustrate the design feasibility of this type of system, below is presented a spreadsheet that illustrates even for a heavy container, the hold-downs can be designed, using medium-strength steel, (maximum stresses are below 100 ksi) to withstand severe stopping loads which would prevent the container from becoming airborne and causing even more damage:

| Roll-off container hold-down stresses Enter numbers in bold | | |
|---|---|---|
| Container mass (kg, lb) | 40,000 | 88,000 |
| Distance from hold-down to front rollers (m, ft) | 5.0 | 16.4 |
| Vertical distance from CG to front rollers (m, ft) | 1.2 | 3.9 |
| Horizontal distance from CG to front rollers (m, ft) | 6.0 | 19.7 |
| Forward velocity (m/s, mph) | 35.0 | 78.3 |
| Deceleration distance (m, ft) | 15.0 | 49.2 |
| Forward acceleration (g) | 17 | |
| Vertical (bump) acceleration (g) | 4 | |
| Forward force on truck (N, lb) | 6,533,333 | 1,468,165 |
| Forward acceleration load on each hold-down (N, lb) (This includes the fact that gravity is acting to hold the container down) | 588,000 | 132,135 |
| Upward (bump) acceleration load on each hold-down (N, lb) | 548,800 | 123,326 |
| Design force per hold-down (N, lb) | 588,000 | 132,135 |
| Distance from hold-down point to center of section (m, in) | 0.075 | 2.95 |
| Design moment (N-m, in-ib) | 44100 | 390,161 |
| Section height (m, in) | 0.065 | 2.56 |
| Section width (m, in) | 0.200 | 7.87 |
| Section modulus (I/c m^3) | 0.000141 | 8.59 |
| Section stress (MN/m^2, psi) | 313 | 45,399 |
| Distance from force to weld plane (m, in) | 0.15 | 5.91 |
| Distance between welds (m/in) | 0.100 | 3.94 |
| Weld cross section (m, in) | 0.020 | 0.79 |
| Moment induced force on welds (N, lb) | 882,000 | 198,202 |
| Weld area (m^2, in^2) | 0.004 | 6.20 |
| Weld stress (MN/m^2, psi) | 221 | 31,968 |

Of the many geometries that can be used for the purposes of the invention, the important thing is that they all be considered systematically, and then the industry may adopt a single standard so that roll-off containers can be made safe and interchangeable, nationwide. The mating receptacle structures, indeed, can be positioned to engage with any length roll-off container, and thus they should be located as far back as possible on the truck to minimize forces required to restrain the container, but not farther back than the shortest container.

Figure 7:
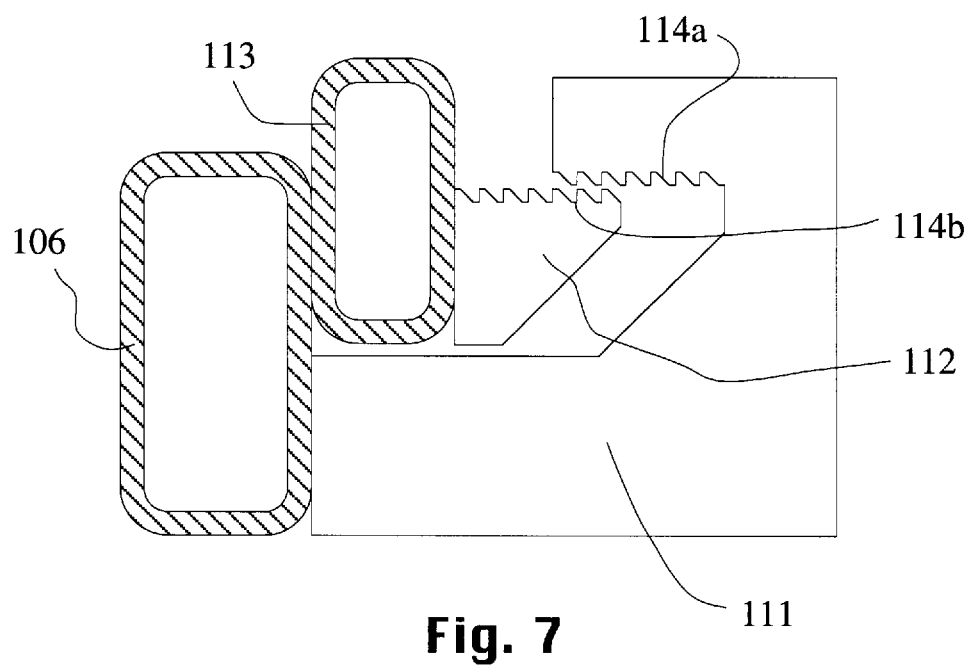
FIG. 7 is the same as FIG. 6, but with the roll-off container rail shifted to the other limit of its tolerance.

With respect to sizing of the elements, FIG. 7 shows a dimensioned scaled cross-section of a typical truck rail and roll-off container. This shows the roll-off container in the farthest displaced-to-the-side condition. As can be seen, even in this condition, the system will still provide effective restraint to the roll-off container.

Further modifications of the invention will also occur to persons skilled in the art, and all such are deemed to fall within the spirit and scope of the invention as defined in the appended claims.

What is claimed is:

1. A system for holding and restraining a longitudinally extending roll-off container on a longitudinally extending truckbed along which, during inclined elevation of the bed, the container has been upwardly winched into position for carrying on the truckbed when the bed is lowered to the horizontal transport position, and, thereafter, during such inclined elevation, the container is lowered downwardly along the bed to touch the ground, the system having, in combination, means for mounting at opposite corresponding regions of longitudinal bottom edges of the container and longitudinal side edges of the bed, respective protuberances and receptacles therefor constituting interlocking teeth that longitudinally slidingly interlock as the container is winched upwardly into position and longitudinally slidingly disengage as the container is winched downwardly off the inclined bed, the locations of said regions being adjusted so that the interlocking is effected during the last distance of upward winching and the disengaging is effected during the initial distance of downward winding, wherein the protuberances are triangular and are welded to the sides of the container bottom structural longitudinal edges and wherein each triangular protuberance has a square section welded to it to assist interlocking engagement with the corresponding mating receptacle, also welded to the bed, such that when forces try to remove the container, as in an accident, the square section interlocks with the mating receptacle to prevent wedging action that would otherwise occur between the triangular protuberances and the mating receptacles.

2. A system as claimed in claim 1 and in which the distances are of the order of about a foot.

3. A system as claimed in claim 1 wherein said protuberances are convex (male), and said mating receptacles are concave (female) such that they mate during the last bit of motion of the container as it is winched onto the truck.

4. A system as claimed in claim 1 wherein protuberances are concave (female) and said mating receptacles are convex (female), such that they mate during a last bit of motion of the container as it is winched onto the truck.

5. A system as claimed in claim 1 wherein the mating protuberances and receptacles engage with any length of roll-off container, being located as far back as possible on the truck to minimize forces required to restrain the container, but not farther back than the shortest container to be used.

* * * * *